Figure 1:
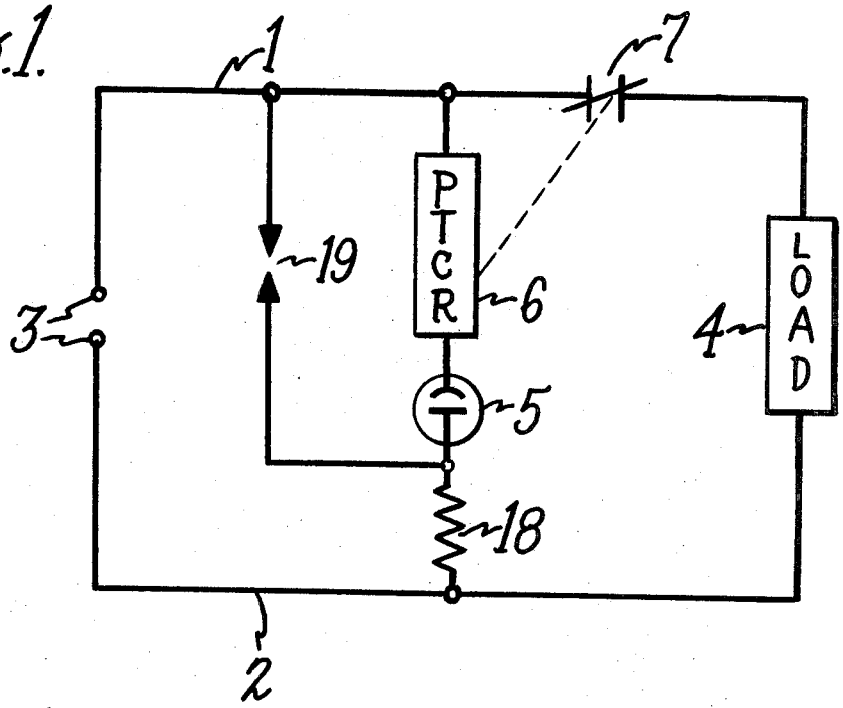

United States Patent [19]
Turner

[11] 3,727,063
[45] Apr. 10, 1973

[54] LIGHTING CONTROL DEVICE
[75] Inventor: Charlie B. Turner, Hendersonville, N.C.
[73] Assignee: General Electric Company
[22] Filed: Nov. 23, 1971
[21] Appl. No.: 201,278

[52] U.S. Cl. ..............250/206, 315/159, 337/378, 250/239
[51] Int. Cl. ..............................H01j 39/12
[58] Field of Search...................250/239, 206, 214; 315/159; 337/100, 377, 378

[56] References Cited
UNITED STATES PATENTS

| | | | |
|---|---|---|---|
| 3,633,036 | 1/1972 | Nuckolls | 315/159 X |
| 3,538,379 | 11/1970 | Berlin | 250/239 X |
| 3,056,035 | 9/1962 | Bernheim | 250/239 |
| 3,496,422 | 2/1970 | Horowitz | 250/239 X |

Primary Examiner—Walter Stolwein
Attorney—Sidney Greenberg et al.

[57] ABSTRACT

Photoelectric control device for switching loads such as street lighting luminaires on and off in response to ambient light levels. The circuit includes a photoelectric cell and a positive temperature co-efficient resistor (PTCR) connected in series across the luminaire load and normally closed contacts of a thermal switch in series with the luminaire load operating in response to the heat level of the PTCR, which thereby serves to compensate for varying levels of ambient temperature.

1 Claim, 2 Drawing Figures

Inventor,
Charlie B. Turner,
by Sidney Greenberg
His Attorney.

LIGHTING CONTROL DEVICE

The present invention relates to control devices for operating electrical systems such as street lighting equipment in response to ambient conditions.

It is an object of the invention to provide a control device of the above type which is simple in construction, economical to manufacture, and reliable in operation.

It is a particular object of the invention to provide a lighting control device of the above type which includes a thermal switch for turning the luminaire load on and off and which compensates for variations in ambient temperature and other conditions adversely affecting its operation, and which may be operated from power supply sources of various voltage levels.

Other objects and advantages will become apparent from the following description and the appended claims.

With the above objects in view, the present invention relates to a control device for controlling the operation of a load comprising, in combination, electric current supply means, photosensitive variable resistance means connected across the electric current supply means, temperature sensitive variable resistance means connected in series with the photosensitive variable resistance means and operating in response to variations in current therethrough and in ambient temperature for producing varying levels of heat, and thermal switch means operating in response to the heat produced by the temperature sensitive variable resistance means for controlling the operation of the load. In accordance with a particular aspect of the invention, the temperature sensitive variable resistance means has a positive temperature co-efficient whereby its resistance increases with an increase in temperature and decreases with a decrease in temperature, so as to limit the heat produced thereby and to accelerate its production of heat under low ambient temperature conditions.

Figure 2:
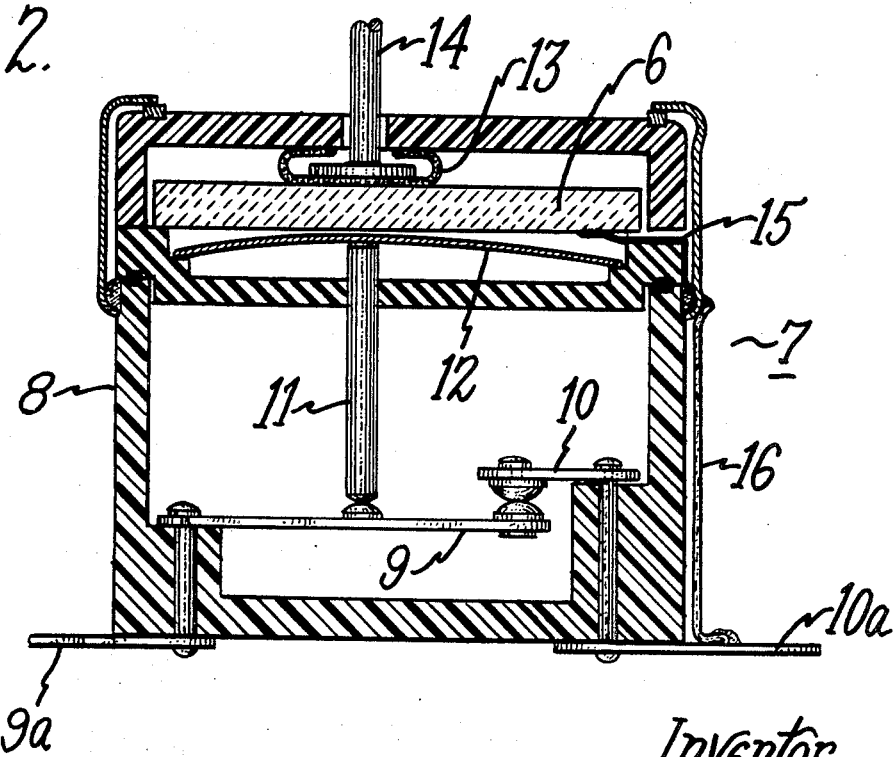

The invention will be better understood from the following description taken in conjunction with the accompanying drawing, in which:

FIG. 1 is a circuit diagram of an embodiment of the temperature regulated control device of the invention; and FIG. 2 is a sectional view of a thermal switch which may be employed in the FIG. 1 device.

Referring now to the drawing, and particularly to FIG. 1, there is shown a photoelectric control device connected to supply lines 1 and 2 having terminals 3 for connection to a suitable power supply, which may be either alternating or direct current. Load 4, which in a typical application of the control device is a street lighting luminaire, is connected to supply lines 1 and 2 for energization by the power supply. Connected to supply lines 1 and 2 across load 4 is photoelectric cell 5, such as a variable resistance cadmium sulfide cell of known type, which is exposed to ambient light rays. Connected in series with photoelectric cell 5 as shown in a temperature sensitive variable resistance element 6 which has a positive temperature co-efficient whereby it increases in resistance with an increase in temperature. As a result, the positive temperature co-efficient resistor (PTCR) 6 functions as a combined heating resistance and as a protective self-temperature-limiting device. Such PTCR's are readily available commercially, and a particular type which has been found satisfactory is in the form of a disk composed mainly of barium titanate.

In the illustrated embodiment, PTCR 6 actuates the normally closed contacts of a thermal switch 7 which is arranged in proximity to, i.e., in thermal contact with, PTCR 6, and having its contacts connected to the supply line in series with load 4, so as to control the operation of the load in response to the heat level of PTCR 6.

An embodiment of a thermal switch in operative association with a PTCR which may be used in practicing the invention is shown in FIG. 2. As there illustrated, the switch comprises a housing 8 of electrically insulating material enclosing normally closed contacts 9, 10 connected by leads 9a, 10a respectively to the load and the supply line. The contacts are adapted to be opened by means of a rod 11 arranged with its bottom end engaging contact 9 and its top end engaging bi-metallic disk 12, which, as will be understood, flexes when heated to push rod 11 downwardly to open contacts 9, 10. Arranged immediately above bi-metallic disk 12 is PTCR 6 which is held in place in housing 8 by spring 13 and having lead connectors 14, 15 connected to opposite sides thereof. Connector 15 is connected by lead 16 to lead 10a as shown.

Spark gap 19 connected in shunt with PTCR 6 and photoelectric cell 5 serves to protect these components from high voltage surges, and resistor 18 in series therewith serves to limit or suppress the surge when spark gap 19 conducts during high voltage conditions.

In the operation of the disclosed control device, current flows through PTCR 6 when ambient light striking photoelectric cell 5 decreases the resistance of the latter. The contacts of thermal switch 7 are normally closed during the hours of darkness, since during this period the resistance of photoelectric cell 5 is high and little or no current passes through PTCR 6. As the intensity of the light rays increases at dawn, the incidence of such light on photoelectric cell 5 decreases its resistance, with the result that current passes therethrough to PTCR 6. If the thermal switch 7 is at moderate ambient temperature, e.g, 25°C, the resistance of PTCR 6 is relatively low, and the passage of current therethrough will rapidly start heating the PTCR. The lower the ambient temperature, the more rapid is the heating of the PTCR. When thermal switch 7 reaches a temperature of, say, 100°C, the switch activates and opens its contacts 9, 10 and turns off luminaire load 4.

With increased heating, PTCR 6 increases its resistance and thereby limits the current passing therethrough, thus limiting the operating temperature of the thermal switch and associated parts. In a typical case, a thermal equilibrium would be reached at a temperature of, say, 120°C, which is above the actuating temperature of thermal switch 6. PTCR 6 in association with thermal switch 7 thus provides a self-correcting constant temperature system which compensates for opposite extremes in ambient temperature conditions and variations in line voltage. For example, when the circuit is in a hot luminaire, the heating watts contributed by the PTCR are automatically reduced; and, conversely, if the luminaire is subjected to very cold ambient temperature, the heating watts generated by the PTCR are automatically increased and due to its characteristics, results in rapid turn-on of thermal switch 7 even under severe cold conditions.

At dusk, the reverse process takes place, wherein the resistance of photoelectric cell 5 increases until no actuating current flows to PTCR 6, and thermal switch 7 then cools off sufficiently to permit its contacts to close, thereby switching luminaire load 4 on. Once thermal switch 7 has closed or opened, its thermal lag or differential is adequate to hold it in that position until a substantial variation in temperature occurs to change its position.

A further advantage afforded by the described system is that the circuit may be operated from supply sources of different voltages, since under higher voltages which might otherwise create excessive temperatures in the circuit components the PTCR, by increasing its resistance, tends to reduce the current and thereby the heat generated in the thermal system. Thus, the described circuit may find application in a dual voltage system of 120 and 240 volts or in a varying voltage system.

While a particular type of thermal switch has been shown and described, various other types of known or suitable thermal switches may be used.

While the positive temperature co-efficient element has been described herein as a resistor, it will be understood that other forms of devices including semiconductors may provide equivalent function, i.e., generate heat by the passage of current and have a positive temperature co-efficient in respect to such characteristic, and accordingly all such devices are contemplated for use in accordance with the invention.

By virtue of the arrangement of the photoelectric cell 5 in series with PTCR 6 as shown, a number of advantages are obtained. For one thing, the photoelectric cell operates somewhat as a switching means for operating the PTCR without the need for additional switch devices and accessories therefor, such as described in co-pending application Ser. No. 725,572 of J.A. Nuckolls, filed Apr. 16, 1968 now U.S. Pat. No. 3,633,036, dated Jan. 4, 1972, and assigned to the same assignee as the present invention. Thus, the use of the photoelectric cell as a switching means as well as the light sensitive element in the described circuit provides the necessary circuit functions with a minimum of components and cost.

The PTCR as represented here would typically have a 25°C resistance value of, say, 8,000 ohms and would not be below a minimum value of 3,500 ohms due to its operational characteristics. The circuit is therefore very efficient in terms of power consumption from its input means. Another benefit of the high resistance of the PTCR is that the selection of the value of the surge limiting resistor 18 is not as critical when compared to the value of the PTCR when considering the voltage drops across the circuit components while the PTCR is at its lowest resistance. This will minimize any deterioration of component parameter stability and thermal stress of the components and ohmic contacts.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A control device for controlling the operation of a load comprising, in combination, electric current supply means, photosensitive variable resistance means connected across said electric current supply means, temperature sensitive variable resistance means connected in series with said photosensitive variable resistance means and operating in response to variations of current therethrough and in ambient temperature for producing varying levels of heat, and thermal switch means operating in response to the heat produced by said temperature sensitive variable resistance means for controlling the operation of the load, said temperature sensitive variable resistance means having a positive temperature co-efficient whereby its resistance increases with an increase in temperature and decreases with a decrease in temperature, so as to limit the heat produced thereby and to accelerate its production of heat under low ambient temperature conditions, said temperature sensitive variable resistance means being in thermal contact with said thermal switch means, and means for connecting said thermal switch means in series with the load and said electric current supply means, said thermal switch means comprising a pair of contacts which are normally closed when said temperature sensitive variable resistance means is in non-operative cool condition, and which are normally open when said temperature sensitive variable resistance means is in operative, heat-generating condition, surge suppressing resistor means connected in series with said photosensitive means and said temperature sensitive variable resistance means, and surge protective means connected across said photosensitive means and said temperature sensitive variable resistance means and in series with said surge suppressing resistor means.

* * * * *